Patented Jan. 6, 1931

1,788,250

UNITED STATES PATENT OFFICE

OLIVER O. RIESER, OF OAK PARK, ILLINOIS, ASSIGNOR TO THE RICHARDSON COMPANY, OF LOCKLAND, OHIO, A CORPORATION OF OHIO

COATED BITUMINOUS SUBSTANCE AND PROCESS OF MAKING SAME

No Drawing.   Application filed April 18, 1928.  Serial No. 271,103.

My invention relates in one phase of its usefulness to articles moulded from bituminous substances, the surfaces of which have been treated so as to render them relatively impervious to the solvents of coating compounds which are applied thereto, and to processes for so rendering the surfaces of the articles relatively impervious to such solvents.

My invention also relates to fibrous materials saturated, and sometimes coated with bituminous substances, the surfaces of which have been treated so as to render them relatively impervious to the solvents of coating compounds which are applied thereto, and to processes for so rendering the surfaces of the articles relatively impervious to such solvents.

In the past the coating of articles made of molded bituminous substances, such as battery boxes or flush tanks has been attempted in a number of different ways. Similarly, floor coverings and saturated fabrics have been treated in a number of different ways. The results, however, to the best of my knowledge and belief have not been entirely successful. The general trend of most of these processes has been toward giving the material a preliminary coating of some priming material following this with the desired coating substances.

The difficulty with attempting to paint articles made from bituminous substances is that the asphalt and pitch or certain other ingredients therein become slightly soluble in the solvent of the coating thereby causing a discoloration which mars the appearance of the article.

It is the object of my invention to so treat particularly the outer surface of the article as to render it impervious to assimilation in the solvent of the coating which is to be applied.

I have found that there are a number of ways in which this process, (which might be likened to the case hardening of metals in that only the surface layer of the article is altered in composition) may be accomplished. It would appear for example, that through the use of oxidizing agents an oxidizing or polymerizing action may be induced on the surface of an article made from bituminous substances which may saturate unsaturated compounds in the bituminous surface, or bring about molecular rearrangements so as to produce compounds of greater molecular weight and greater insolubility in the paint or lacquer solvents. In any event, by the treatment which I shall outline the outer surface of an article made of bituminous substances may be altered so that when paint or lacquer or the like is applied there is no substantial discoloration of them.

As examples of different ways in which the outer surface of articles made of bituminous substances may be rendered relatively impervious to coating solvents I will give the results of a series of experiments with different chemicals with which such substances have been treated. Since discoloration most frequently is progressive with time, it will be understood that the following results all take into account the time factor.

Bleaching powder

An article molded from a bituminous substance was immersed in a solution of $CaOCl_2$. The article was then removed, the surface was dried, and it was painted with ordinary paint such as a cheap white-lead-in-oil paint. The paint showed slight discoloration. Another article of similar nature was suspended in the vapor arising from a bath of a solution of $CaOCl_2$ which had been heated to 150 degrees Fahrenheit. This article was then painted, and the results were quite favorable since the discoloration of the paint was only very slight.

Potassium dichromate

An aqueous saturated solution of 500 cc. of $K_2Cr_2O_7$ was mixed with 200 cc. of 6NHCl. An article made from bituminous substances was immersed in the solution at room temperature for several hours. The article was then taken out and dried and painted. The discoloration was materially decreased over the discoloration which occurred in the paint with which an untreated article of similar composition was painted. Further experiments with the same solution heated to 150 degrees Fahrenheit were not considered successful because although there was no material discoloration of the paint, the surface of the article was badly corroded by the corrosive action of the treating agent.

Oxygen gas

Oxygen gas was generated by the action of $H_2SO_4$ on $KClO_3$ and $MnO_2$, the latter being used as a catalytic agent. The gas was passed through water to purify it. An article made from bituminous substances was placed in a container in which the oxygen gas was retained for twelve hours at room temperature. After painting, it stained somewhat, but much less than the blank specimen which was not subjected to the oxygen treatment.

Chlorine gas

Chlorine gas was generated by the reaction of concentrated HCl on $MnO_2$ at a temperature of about 200 degrees Fahrenheit. An article made of bituminous substances was then immersed in a concentrated atmosphere of $Cl_2$ at 760 mm. pressure for six hours at room temperature. Upon painting there was no discoloration of the paint and the surface the article remained unimpaired. In order to test what duration of exposure of the molded article to the chlorine atmosphere is necessary a series of tests, in which the time element was reduced, were run and it was found that five to ten minute exposure did not result in any discoloration.

Nitric acid

An article made from a bituminous substance was immersed in concentrated nitric acid for about one-half hour at room temperature, and after washing off the acid with water and drying, it was painted. The duration of exposure to the acid depends upon the composition of the bituminous substance. Similarly, a nitrating mixture of one part concentrated sulphuric acid with two parts nitric acid was permitted to react on the surface of an article made from a bituminous substance for two minutes. After being washed clean with water and painted, no stain developed.

To account for the actions of these reagents on the bituminous substance in preventing the staining of paints subsequently applied, in the case of chlorine it is logical to suppose that the reaction is actually oxidation from the effect produced by chemicals other than chlorine or its products. In organic substances it is a known fact that free chlorine gas will readily displace the hydrogen atoms of certain compounds, although $Cl_2$ compounds will not react with the same vigor. Hence, the $Cl_2$ probably also reacts with the lighter oils of the bituminous substance to produce oxidation. Polymerization of bituminous substances is known to accompany oxidation in many cases, but is not easily explained.

A nitrating mixture presumably acts both to oxidize and nitrate constituents of a bituminous substance and to thus convert them into modifications insoluble in ordinary solvents.

In selecting the particular treatment to which articles made from bituminous substances are to be subjected in order to render the outer surface substantially insoluble in paint or lacquer solvents, it should be borne in mind that materials which tend to render the surface corroded and porous should not be used. For some pigmenting agents, however, this may be desirable.

Inasmuch as no one has heretofore suggested the idea of treating an article made from bituminous substances so as to render the surface impervious to the solvent of paints, lacquers and other surface coatings I claim the same broadly herein not wishing to restrict myself to the specific agents the tests with which have been noted.

Having thus described my invention, what I claim as new and desire to secure by Letters Patent, is:—

1. A process for treating articles made from bituminous substances in order to make surfaces thereof impervious to the solvents with which coatings may be applied thereto, which consists in exposing the articles to the action of chlorine.

2. A process for treating articles made from bituminous substances in order to make surfaces thereof impervious to the solvents with which coatings may be applied thereto, which consists in exposing the surfaces of the articles to be coated to the action of chlorine.

3. The initial step in the art of coating or painting articles made from bituminous substances, which consists in chemically treating the articles so as to render the surfaces to which the coating is to be applied impervious to the solvent with which the coating is applied.

4. The initial step in the art of coating or painting articles made from bituminous substances which consists in treating the articles so as to render the surfaces to which the coating is to be applied impervious to the solvent with which the coating is applied, said treatment comprising the exposure of the surfaces of the articles to some chemical action which makes the bituminous surfaces less soluble without changing the other properties of the bituminous substances such as the heat resistance, or tensile strength.

5. The process of treating articles made from bituminous substances which consists in rendering the surface of an article impervious to the action of a solvent with which a coating may be applied thereto by exposure of the surface to a chemical action which renders said surface substantially insoluble in said solvent without producing substantial corrosion of said surface.

6. The process of treating articles made from bituminous substances which consists in rendering the surface of an article impervious to the action of a solvent with which a coating may be applied thereto by exposure of the surface to the action of chlorine.

7. The process of treating articles made from bituminous substances which consists in rendering the surface of an article impervious to the action of a solvent with which a coating may be applied thereto, by exposure of the surface to the action of chlorine for a period of at least five minutes.

OLIVER O. RIESER.